(12) United States Patent
Watanabe et al.

(10) Patent No.: US 8,310,358 B2
(45) Date of Patent: Nov. 13, 2012

(54) AUTHENTICATION APPARATUS, AUTHENTICATION METHOD, AND AUTHENTICATION PROGRAM

(75) Inventors: Masaki Watanabe, Kawasaki (JP); Toshio Endoh, Kawasaki (JP); Takahiro Aoki, Kawasaki (JP); Mitsuaki Fukuda, Kawasaki (JP); Soichi Hama, Kawasaki (JP); Hironori Yokoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 12/490,750

(22) Filed: Jun. 24, 2009

(65) Prior Publication Data
US 2009/0261947 A1  Oct. 22, 2009

Related U.S. Application Data

(63) Continuation of application No. PCT/JP2006/325744, filed on Dec. 25, 2006.

(51) Int. Cl.
*G08B 23/00* (2006.01)
(52) U.S. Cl. ..... 340/500; 340/573.1; 340/5.8; 340/5.81; 340/5.82; 340/5.85
(58) Field of Classification Search ................. 340/500, 340/573.1, 5.1, 5.2, 5.21, 5.22, 5.8, 5.81, 340/5.82, 5.83, 5.84, 5.85; 705/64; 713/186, 713/176; 726/6, 7, 18, 19
See application file for complete search history.

(56) References Cited

U.S. PATENT DOCUMENTS

| | | | |
|---|---|---|---|
| 6,957,338 B1 | 10/2005 | Sumino et al. | |
| 7,007,298 B1 | 2/2006 | Shinzaki et al. | |
| 8,059,858 B2 * | 11/2011 | Brundage et al. | 382/100 |
| 2001/0049785 A1 | 12/2001 | Kawan et al. | |
| 2002/0186838 A1 * | 12/2002 | Brandys | 380/30 |
| 2004/0164848 A1 | 8/2004 | Hwang et al. | |
| 2005/0286761 A1 * | 12/2005 | Xu | 382/159 |
| 2006/0165262 A1 | 7/2006 | Genda | |
| 2007/0016790 A1 * | 1/2007 | Brundage et al. | 713/176 |
| 2010/0127827 A1 * | 5/2010 | Watanabe | 340/5.83 |
| 2010/0275258 A1 * | 10/2010 | Kamakura | 726/19 |
| 2010/0293612 A1 * | 11/2010 | Potkonjak | 726/20 |

FOREIGN PATENT DOCUMENTS

| | | |
|---|---|---|
| EP | 1441276 A2 | 7/2004 |
| JP | 2000-200113 A | 7/2000 |
| JP | 2000215172 A | 8/2000 |

(Continued)

OTHER PUBLICATIONS

International Search Report of PCT/JP2006/325744, date of mailing Jan. 23, 2007.
European Search Report dated Apr. 6, 2011, issued in correspoonding European Patent Application No. 06843148.5.

(Continued)

*Primary Examiner* — Daryl Pope
(74) *Attorney, Agent, or Firm* — Westerman, Hattori, Daniels & Adrian, LLP

(57) ABSTRACT

Disclosed is an authentication apparatus easily achieving convenience and high accuracy in authentication. The authentication apparatus has an authentication accuracy simulation section that simulates authentication accuracy and also has a registration information setting section that sets an ID and biometric information input as registration information. The authentication accuracy simulation section uses an ID and biometric information that has been input as registration information by a user at the time of registration and the registered registration information to simulate authentication accuracy with which the user is authenticated. When the authentication accuracy simulated by the authentication accuracy simulation section does not satisfy a predetermined condition, the registration information setting section rejects registration of the ID input as the registration information.

18 Claims, 6 Drawing Sheets

FOREIGN PATENT DOCUMENTS

| | | |
|---|---|---|
| JP | 2000259278 A | 9/2000 |
| JP | 2000259828 A | 9/2000 |
| JP | 2000-123179 A | 4/2004 |
| JP | 2005157746 A | 6/2005 |
| JP | 2006085265 A | 3/2006 |

OTHER PUBLICATIONS

International Preliminary Report Patentability (Form PCT/IB/338) of International Application No. PCT/JP2006/325744 with Form PCT/IB/237.

* cited by examiner

FIG. 3

```
FOUR-DIGIT NUMBER CAN BE REGISTERED AS YOUR ID.
CURRENTLY, THE FOLLOWING IDS ARE AVAILABLE.
```

| OOOO | ×××× | △△△△ | □□□□ | OOOO | ×××× | △△△△ |
| □□□□ | OOOO | ×××× | △△△△ | □□□□ | OOOO | ×××× |
| △△△△ | □□□□ | OOOO | ×××× | △△△△ | □□□□ | OOOO |
| ×××× | △△△△ | □□□□ | OOOO | ×××× | △△△△ | □□□□ |
| OOOO | ×××× | △△△△ | □□□□ | OOOO | ×××× | △△△△ |
| □□□□ | OOOO | ×××× | △△△△ | □□□□ | OOOO | ×××× |

NEXT CANDIDATE

FIG. 4

SPECIFIED ID HAS BEEN USED BY ANOTHER USER.
PLEASE SELECT ANOTHER ID.

FIG. 5

SPECIFIED ID HAS BEEN USED BY A PREDETERMINED UPPER-LIMIT NUMBER OF USERS.
PLEASE SELECT ANOTHER ID.

FIG. 6

MATCHING TIME FOR AUTHENTICATION
IS EXPECTED TO BE ABOUT ○ SECONDS.
DO YOU DESIRE TO CHANGE CURRENT ID
TO ID THAT CAN REDUCE MATCHING
TIME?

FIG. 8

```
MATCHING TIME WAS ABOUT ○
SECONDS.
DO YOU DESIRE TO CHANGE CURRENT
ID TO ID THAT CAN REDUCE MATCHING
TIME?
```

AUTHENTICATION APPARATUS, AUTHENTICATION METHOD, AND AUTHENTICATION PROGRAM

TECHNICAL FIELD

The present invention relates to an authentication apparatus, an authentication method, and an authentication program that use, e.g., biometric information to authenticate identity and, more particularly, to registration processing of identification information used for narrowing down the amount of candidates to be searched for in an identification technique called "one-to-many identification".

BACKGROUND ART

Conventionally, in an authentication technique using biometric information, two different processing of "Authentication" and "Identification" are performed.

The "Authentication" includes registering the biometric information of a user having a specified ID, and obtaining once again the biometric information of the user so as to determine whether the biometric information matches the previously registered biometric information. This is called "one-to-one verification".

The "Identification" includes registering biometric information of many persons and obtaining once again the biometric information of a target user so as to determine which one of the registered persons the target user matches. This is called "one-to-many identification" These two processing have both an advantage and a disadvantage, respectively.

That is, in "one-to-one verification" in which a user specifies an ID that can identify a particular individual, authentication processing can be performed at high speed and with high accuracy, while an ID specification operation is cumbersome for a person to be authenticated and there is a possibility that the ID would be forgotten.

On the other hand, in "one-to-many identification" in which an ID that can identify a particular individual is not used but which one of a plurality of persons is identified, it is possible to eliminate the need to use the ID, while authentication processing cannot be performed at high speed and with high accuracy.

As to a conventional "one-to-many identification" technique, in order to achieve high speed and high accuracy authentication processing, there has been used a method that narrows down the amount of information to be matched by using auxiliary information such as an ID or password.

For example, there is known a method in which part of input information is used as a hash. This method includes: setting arbitrary bits of individual identification information (ID) as selection information; searching for individual identification information including the selection information corresponding with selection information input through a selection information input means; and matching biometric information corresponding to the searched individual identification information which are stored in an individual information storage means and biometric information input through a biometric information input means so as to identify an individual (refer to, e.g., Patent Document 1).

Further, there is known a technique in which biometric information and password that a user can freely set are combined, and the amount of information to be searched for in the "one-to-many identification" is narrowed down by the password (refer to, e.g., Patent Document 2).

Further, as a technique using auxiliary information, there is known a technique that uses a function of simulating authentication accuracy. In this technique, in the case where the authentication accuracy does not satisfy a predetermined criterion, a user is required to input a password as auxiliary information for verification of identity (refer to, e.g., Patent Document 3).

Patent Document 1: Japanese Laid-Open Patent Publication No. 2000-123179
Patent Document 2: Japanese Laid-Open Patent Publication No. 2000-215172
Patent Document 3: Japanese Laid-Open Patent Publication No. 2000-259278

DISCLOSURE OF THE INVENTION

Problems to be Solved by the Invention

There remains a doubt whether conventional techniques relating to "one-to-many identification" function satisfactorily in terms of convenience and authentication accuracy. In the above Patent Document 1, the selection information or group number is used to reduce the size of a set to be searched for in "one-to-many identification". However, the selection information or group number is information that a user cannot freely set but is information imparted to a user from a system. Thus, there is a high possibility that the user forgets it, which may result in loss of function.

Further, in the above Patent Document 2, the password that a user can freely set is used and therefore a possibility that the user forgets it is low. However, users tend to select an easy-to-remember password, that is, in the case of, e.g., four-digit password, they tend to select a password with regularity such as "1234" or "7777". Therefore, users are concentrated on some passwords, making it difficult to narrow down the amount of information to be searched for in "one-to-many identification". As a result, it becomes impossible to attain original purposes, i.e., a reduction in the search time and maintenance of high accuracy.

Further, in the case of the above Patent Document 3, although the authentication accuracy can be simulated, no measures have been taken to reduce matching time. Thus, user convenience is not sufficiently taken into consideration.

In view of the conventional techniques, it can be expected that a method of reducing the size of a set to be searched for in "one-to-many identification" produces some effect in terms of improvement in convenience and ensuring of authentication accuracy in "one-to-many identification" However, when it is not guaranteed that the mechanism produces an effect, it is very difficult to obtain satisfactory effectiveness. The present invention has been made to achieve improvement in convenience and ensuring of authentication accuracy in "one-to-many identification", and an object thereof is to provide a method for reducing the size of a set to be searched for in "one-to-many identification" while ensuring execution capability by previously simulating authentication accuracy at the time of registration of individual identification information such as ID when the individual identification information is used and providing a result of the simulation and to ensure the effect produced by the method.

Means for Solving the Problems

The present invention has been made to solve the above problems and the present invention provides an authentication apparatus that uses an ID and biometric information that have been registered and an ID and biometric information that are input after the registration to authenticate a user corresponding to the ID and biometric information that are input after the registration. The authentication apparatus is characterized by including: an authentication accuracy simulation section that simulates authentication accuracy for authentication; and a registration information setting section that sets the ID and biometric information that are input, wherein the authentication accuracy simulation section uses the ID and biometric information that are input as registration information by the user at the time of registration and the ID and biometric information that have been registered so as to simulate authentication accuracy where the user who input the ID and biometric information as the registration information is authenticated, and the registration information setting section requests the user to change the ID input as the registration information when the authentication accuracy simulated by the authentication accuracy simulation section does not satisfy a predetermined condition.

The authentication apparatus according to the present invention includes a matching time simulation section that simulates matching time for authentication, wherein the matching time simulation section uses the ID and biometric information that have been input as registration information by the user and registered registration information to simulate matching time required to authenticate the user, and the registration information setting section presents the matching time simulated by the matching time simulation section to the user and receives an instruction to change the ID from the user.

The authentication apparatus according to the present invention includes a timer section that measures matching time required in the case where the ID and biometric information that have been input by the user at the time of authentication and registered registration information are used to authenticate the user, wherein the registration information setting section presents matching time measured by the timer section to the user and receives an instruction to change the ID from the user.

In the authentication apparatus according to the present invention, in the case where the registration information setting section received the instruction to change the ID, the authentication accuracy simulation section uses a newly input ID, registered biometric information and registered registration information to simulate authentication accuracy with which the user is authenticated, and the registration information setting section rejects registration of the newly input ID when the authentication accuracy simulated by the authentication accuracy simulation section does not satisfy a predetermined condition.

In the authentication apparatus according to the present invention, the registration information setting section requests the user to change the ID input as the registration information when the authentication accuracy simulated by the authentication accuracy simulation section does not satisfy a predetermined condition.

The authentication apparatus according to the present invention includes a matching time simulation section that simulates matching time for authentication, wherein the matching time simulation section uses the newly input ID, registered biometric information, and registered registration information to simulate matching time required to authenticate the user, and the registration information setting section presents the matching time simulated by the matching time simulation section to the user and receives an instruction to change the ID from the user.

In the authentication apparatus according to the present invention, the ID is constituted by a plurality of characters or numbers, or a combination thereof, and the number of digits of the ID is set to the same value among all users or set to an arbitrary value not more than a predetermined upper limit.

In the authentication apparatus according to the present invention, the registration information setting section applies at least one of quantization and noise addition to authentication accuracy simulated by the authentication accuracy simulation section and presents the resultant authentication accuracy to the user using a numeric value or symbol.

In the authentication apparatus according to the present invention, available IDs for which simulated authentication accuracy satisfies a predetermined condition are displayed at the time of at least one of the ID registration and the ID change.

In the authentication apparatus according to the present invention, when the user inputs an ID with a plurality of input operation steps at the authentication time, if the user ID can uniquely be identified before completion of the plurality of input operation steps, the user authentication processing can be started at an input operation step at which the user ID has been identified.

In the authentication apparatus according to the present invention, when the user inputs an ID with a plurality of input operation steps at the authentication time, even if the user ID cannot uniquely be identified, if the number of pieces of registered registration information corresponding to the ID whose first some digits coincide with input digits is less than a predetermined number, the user authentication processing can be started at an input operation step at which the number of pieces of the registration information is less than a predetermined number.

In the authentication apparatus according to the present invention, the authentication accuracy simulation section performs the authentication accuracy simulation based on the number of pieces of registration information to be searched for.

In the authentication apparatus according to the present invention, the matching time simulation section performs the matching time simulation based on the number of pieces of registration information to be searched for or actually measures the matching time using biometric information corresponding to a target user.

The present invention further provides an authentication program for allowing a computer to execute an authentication method that uses an ID and biometric information that have been registered and an ID and biometric information that are input after the registration to authenticate a user corresponding to the ID and biometric information that are input after the registration, the program allowing the computer to execute: an authentication accuracy simulation step that simulates authentication accuracy for authentication; and a registration information setting step that sets the ID and biometric information that are input, wherein the authentication accuracy simulation step uses the ID and biometric information that are input as registration information by the user at the time of registration and the ID and biometric information that have already been registered to simulate authentication accuracy where a user who input the ID and biometric information as the registration is authenticated, and the registration information setting step requests the user to change the ID input as the registration information when the authentication accuracy simulated in the authentication accuracy simulation step does not satisfy a predetermined condition.

The authentication program according to the present invention includes a matching time simulation step that simulates matching time for authentication, wherein the matching time simulation step uses the ID and biometric information that have been input as registration information by the user at the time of registration and the registered registration information to simulate matching time required to authenticate the user, and the registration information setting step presents the matching time simulated by the matching time simulation section to the user and receives an instruction to change the ID from the user.

The authentication program according to the present invention includes a time counting step that measures matching time required in the case where the ID and biometric information that have been input by the user at the time of authentication and the registered registration information are used to authenticate the user, wherein the registration information setting step presents matching time measured by the time counting step to the user and receives an instruction to change the ID from the user.

In the authentication program according to the present invention, in the case where the registration information setting step received the instruction to change the ID, the authentication accuracy simulation step uses a newly input ID, registered biometric information and the registered registration information to simulate authentication accuracy with which the user is authenticated, and the registration information setting step rejects registration of the newly input ID when the authentication accuracy simulated in the authentication accuracy simulation step does not satisfy a predetermined condition.

The present invention further provides an authentication method that uses an ID and biometric information that have been registered and an ID and biometric information that are input after the registration to authenticate a user corresponding to the ID and biometric information that are input after the registration, including: an authentication accuracy simulation step that simulates authentication accuracy for authentication; and a registration information setting step that sets the ID and biometric information that are input, wherein the authentication accuracy simulation step uses the ID and biometric information that are input as registration information by the user at the time of registration and the ID and biometric information that have already been registered to simulate authentication accuracy where a user who input the ID and biometric information as the registration is authenticated, and the registration information setting step requests the user to change the ID input as the registration information when the authentication accuracy simulated in the authentication accuracy simulation step does not satisfy a predetermined condition.

BRIEF DESCRIPTION OF THE DRAWINGS

FIG. 3 is an ID selection screen displaying available IDs;

FIG. 4 shows a message prompting the user to change his ID so as to prevent a reduction in the authentication accuracy due to overlapping registration of the same ID;

FIG. 5 shows another message prompting the user to change his ID so as to prevent a reduction in the authentication accuracy due to use of the same ID by more than a predetermined number of users;

FIG. 6 is a message notifying the user of the matching time obtained as a result of the simulation corresponding to the input (specified) ID and asking the user if he wants to change the current ID to an ID that can reduce the matching time;

FIG. 8 is a message notifying the user of the simulated matching time corresponding to the input (specified) ID and asking the user if he wants to change the current ID to an ID that can reduce the matching time.

BEST MODE FOR CARRYING OUT THE INVENTION

In an embodiment of the present invention, in order to ensure user convenience and authentication accuracy with effectiveness in "one-to-many identification", input of an ID (individual identification information) and biometric information authentication technique are combined in "one-to-many identification" and, at the time of authentication, the ID is input and then biometric information authentication technique is applied. Further, the ID to be set at the time of registration can freely be selected by a user. With this configuration, the matching time and authentication accuracy for the selected ID are simulated. The matching time obtained as a result of the simulation is fed back and an opportunity to change the ID is given to a user. The authentication accuracy obtained as a result of the simulation is not fed back. However, when the authentication accuracy falls below a predetermined value, the ID is forcibly changed.

The authentication accuracy includes FAR (False Accept Rate) and FRR (False Rejection Rate). In an individual identification system based on biometric information, FAR and FRR are previously set for "one-to-one verification (determining whether one person to be verified matches the one registered person)". Authentication employed in the present embodiment is "one-to-many identification (determining whether one person to be identified matches any one of N registered persons)" In this "one-to-many identification", FAR (rate at which other person is erroneously authenticated) becomes a major concern. Assuming that FAR in "one-to-one verification" is FAR1 and FAR at the time when one person is matched with N person in "one-to-many identification" is FAR(N), FAR(N) can be calculated from FAR1 and N as follows.

$$FAR(N)=1-(1-FAR(1))^N$$

When FAR1 is sufficiently low, the above equation can be approximated to FAR(N)=N×FAR1. However, this is not applied in an individual identification method in which FRR is changed in accordance with N. Hereinafter, a detailed description will be given of the present invention.

Figure 1:
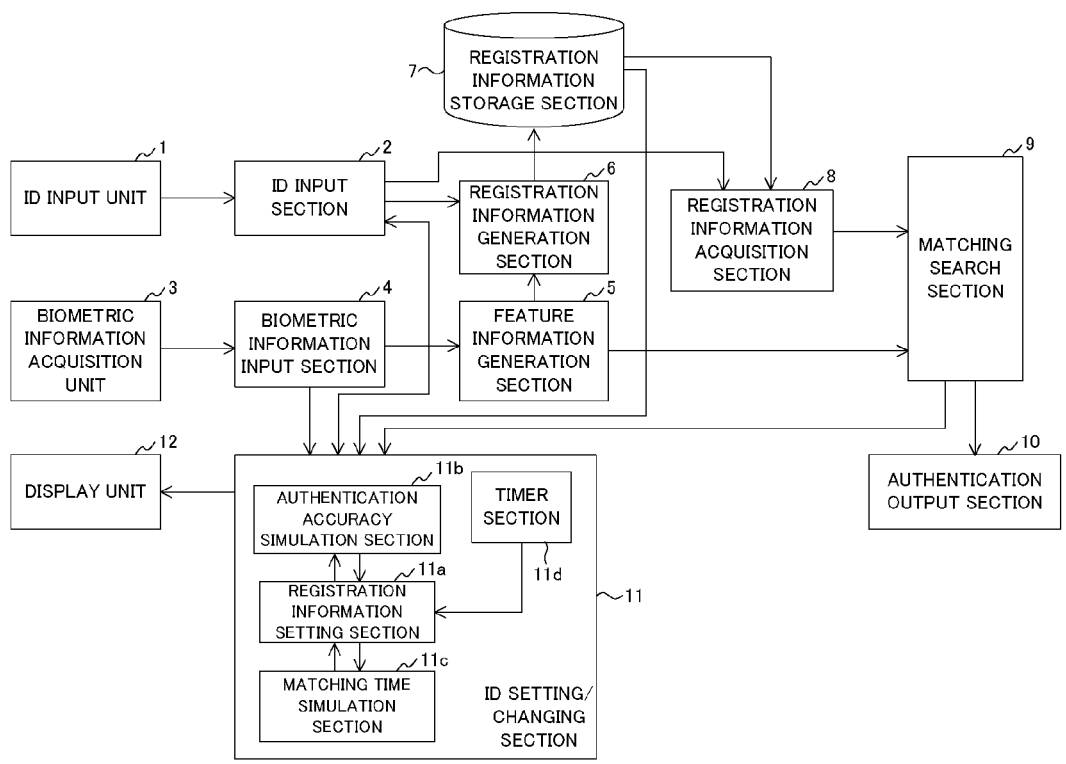
FIG. 1 is a block diagram showing an authentication apparatus according to an embodiment of the present invention.

FIG. 1 is a block diagram showing an embodiment of the present invention. An authentication apparatus shown in FIG. 1 includes an ID input unit 1 with which a user inputs his ID, an ID input section 2 that inputs the ID input to the ID input unit 1 to the apparatus; a biometric information acquisition unit 3 that acquires biometric information from the user, a biometric information input section 4 that inputs the biometric information acquired from the biometric information acquisition section 3 to the apparatus, and a feature information generation section 5 that generates biometric information from the biometric information input by the biometric information input section 4.

The authentication apparatus further includes a registration information generation section 6 that generates, at the user registration time, information to be registered for authentication based on the biometric information generated by the feature information generation section 5 and ID input by the ID input section 2, and a registration information storage section 7 that stores the registration information generated by the registration information generation section 6.

The authentication apparatus further includes a registration information acquisition section 8 that acquires, at the user authentication time, the registration information concerning the ID from the registration information storage section 7, a matching search section 9 that performs matching search based on the feature information generated by the feature information generation section 5 and registration information acquired by the registration information acquisition section 8 and then performs authentication processing, and an authentication output section 10 that outputs a result of the authentication processing.

The authentication apparatus still further includes an ID setting/changing section 11 that performs, at the user registration time, simulation of the authentication processing based on the registration information stored in the registration information storage section 7, ID input by the ID input section 2, and biometric information input by the biometric information input section 4 and outputs a change instruction for prompting the user to change the input ID based on a result of the simulation and, at the time of authentication, asks at appropriate timings the user to change the ID so as to allow the user to change the ID at his request and a display unit 12 that displays the output of the ID setting/changing section 11. The ID setting/changing section 11 determines validity of the ID and prompts the user to review continuous use of the ID. More specifically, the ID setting/changing section 11 functionally includes a registration information setting section 11*a* that registers an ID that the user himself determines at the registration time and his biometric information, an authentication accuracy simulation section 11*b* that simulates, at the registration time, authentication accuracy for the user's desired ID and biometric information, a matching time simulation section 11*c* that simulates matching time required for authentication processing, and a timer section 11*d* that measures matching time and elapsed time.

Hereinafter, a detailed description will be made of the respective sections. The ID input unit 1 is an I/O unit with which the user inputs an ID that he himself has determined. A device such as a numeric keypad, a keyboard, or touch panel corresponds to the ID input unit 1. The ID input section 2 is a processing section that receives an input of the user ID. The ID input section 2 controls the ID input unit 1 and receives the ID that the user has input using the ID input unit 1.

The biometric information acquisition unit 3 is a unit for inputting biometric information of the user. The biometric information acquisition unit 3 acquires information such as fingerprint, face, iris, signature, voiceprint, palm shape, and blood vessel pattern in a palm, dorsal hand, or finger according to a method corresponding to an authentication apparatus employed and outputs the acquired information to the apparatus.

The biometric information input section 4 controls the biometric information input unit 3 and inputs the biometric information of the user to the apparatus. The feature information generation section 5 converts the biometric information input by the biometric information input section 4 into feature information. For example, in the case of fingerprint authentication, minutiae (feature points such as end points or branch points) is extracted from a fingerprint image.

The registration information generation section 6 associates the feature information that the feature information generation section 5 has generated by converting the biometric information with the ID input through the ID input section 2 to generate registration information representing a registration of an individual. The registration information storage section 7 stores the registration information that the registration information generation section 6 has generated by associating the ID and feature information which has been converted from the biometric information.

The ID setting/changing section 11 simulates matching time and authentication accuracy when "one-to-many identification" is executed for the ID selected by the user and determines validity and the like of the ID. The ID setting/changing section 11 presents the simulated matching time to the user to give him an opportunity to change the ID. Further, when the simulated authentication accuracy falls below a predetermined value, the ID setting/changing section 11 prompts the user to change the ID.

The registration information acquisition section 8 acquires registration information corresponding to the ID input through the ID input section 2 from the registration information storage section 7. Since the user can freely determine the ID, there may be a case where the same ID is assigned to different users. Therefore, there may be a case where there exist plurality of registration information corresponding to a specified ID.

The matching search section 9 searches for feature information coinciding with the feature information that the feature information generation section 5 has generated by converting the biometric information input through the biometric information input section 4 among one or more pieces of registration information acquired by the registration information acquisition section 8.

Figure 2:
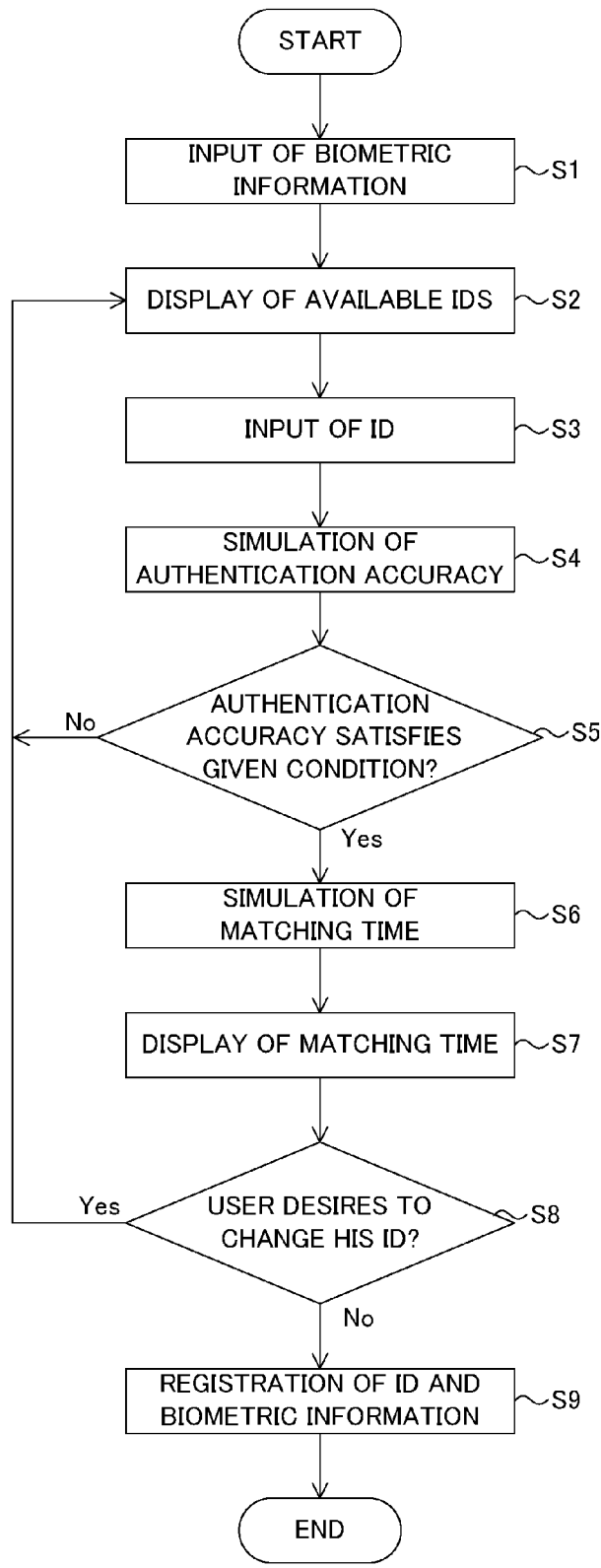
FIG. 2 is a flowchart showing registration operation according to the embodiment.

Hereinafter, operation of the ID setting/changing section 11 according to the present embodiment will be described. First, operation of the ID setting/changing section 11 at the user registration time will be described with reference to a flowchart of FIG. 2.

The biometric information is input through the biometric information acquisition unit 3 and biometric information input section 4 (step S1), and ID is input through the ID input unit 1 and ID input section 2 (steps S2 and S3).

As shown in FIG. 3, a selection screen presenting available IDs is displayed at the ID input time (step S2). An ID that applies to the following cases is excluded from the available IDs. Further, in terms of authentication accuracy and authentication time (matching time), an ID that is used by more than a predetermined number of users is excluded from the available IDs.

The display shown in FIG. 3 is made on the ID input unit 1. When the user selects desired one of the displayed IDs, the selected ID is sent to the ID input section 2 (step S3).

In place of the display of step S2, an ID input screen on which the user can freely input the ID may be displayed. In this case, when an ID that may decrease the authentication accuracy is input, a screen as shown in FIG. 4 or FIG. 5 may be displayed so as to prompt the user to change the currently input ID to another ID.

FIG. 4 shows a message prompting the user to change his ID so as to prevent a reduction in the authentication accuracy due to overlapping registration of the same ID, which is displayed when a user inputs (specifies) an ID that has been registered by another user. FIG. 5 shows another message prompting the user to change his ID so as to prevent a reduction in the authentication accuracy due to use of the same ID by more than a predetermined number of users, which is displayed when a user inputs (specifies) an ID that has been registered by other users.

After input of the ID and biometric information, the ID setting/changing section 11 performs simulation of authentication accuracy (step S4).

Here, the authentication accuracy simulation will be described. The authentication accuracy includes FAR (False Alarm Rate) and FRR (False Rejection Rate). In an individual identification system based on biometric information, FAR and FRR are previously set for "one-to-one verification (determining whether one person to be verified matches the one registered person)" In "one-to-many identification (determining whether one person to be identified matches any one of N registered persons)", FAR becomes a major concern. Therefore, the authentication accuracy simulation in the present embodiment estimates FAR of "one-to-many identification".

Assuming that FAR in "one-to-one verification" is FAR(1), the number of biometric information to be searched for is N, and FAR in "one-to-many identification" is FAR(N), FAR(N) can be estimated from FAR(1) and N according to the following equation.

$$FAR(N)=1-(1-FAR(1))^N$$

When FAR(1) is sufficiently low, the above equation can be approximated as follows.

$$FAR(N)=N \times FAR(1).$$

However, the above equation is not applied in an individual identification system in which FRR is changed in accordance with N.

In the authentication accuracy simulation, FAR(N) may be estimated from the input ID and biometric information, and registered ID and biometric information by using an existing statistical approach.

The ID setting/changing section 11 determines whether the authentication accuracy obtained as a result of the simulation satisfies a given condition (step S5). When determining that the authentication accuracy satisfies the condition (Yes in step 5), the ID setting/changing section 11 performs simulation of matching time (step S6).

Here, the matching time simulation will be described. The matching time simulation of the present embodiment estimates the matching time of "one-to-many identification" The matching time of "one-to-one verification" can be measured by previously executing matching processing. Assuming that matching time of "one-to-one verification" is T(1), the number of pieces of biometric information to be searched for is N, and matching time of "one-to-many identification" is T(N), T(N) can be approximated to the following equation. In the following equation, to denotes a time taken to complete preprocessing for the matching and corresponds to the processing time of the feature information generation section 5 of FIG. 1. Further, T(1) denotes the processing time of the matching search section 9 of FIG. 1.

$$T(1)=t(1)+t0$$

$$T(N)=N \times t(1)+t0$$

Note that the matching time simulation may estimate the matching time varied with the value of N in the following manner. That is, matching processing is executed while the value of N is varied, and the time required to complete the matching processing is recorded for each value of N to create a matching time table. By referring to the matching time table, the matching time based on the value of N can be estimated. Further, the matching time simulation may perform matching processing using the input ID and biometric information, measure the time required to complete the matching processing, and obtain a result of the measurement as the matching time.

After completion of the matching time simulation, the matching time obtained as a result of the simulation is displayed on the display unit 12 (step S7). When the user determines to change his ID by referring to the displayed matching time (Yes in step S8), the flow returns to step S2 where the user is allowed to input his desired ID once again.

For example, in step S7, a message as shown in FIG. 6 may be displayed to ask the user if he wants to change his ID. FIG. 6 is a message notifying the user of the matching time obtained as a result of the simulation corresponding to the input (specified) ID and asking the user if he wants to change the current ID to an ID that can reduce the matching time.

In the case where it is determined, based on the input biometric information and registered registration information, that the authentication accuracy or matching time does not satisfy a predetermined condition, corresponding ID may be previously excluded from the ID selection screen of FIG. 3.

When the user does not desire to change his ID (No in step S8), the selected/input ID and feature information generated from the biometric information are registered in the registration information storage section 7 (step S9), and the registration operation is ended.

Figure 7:
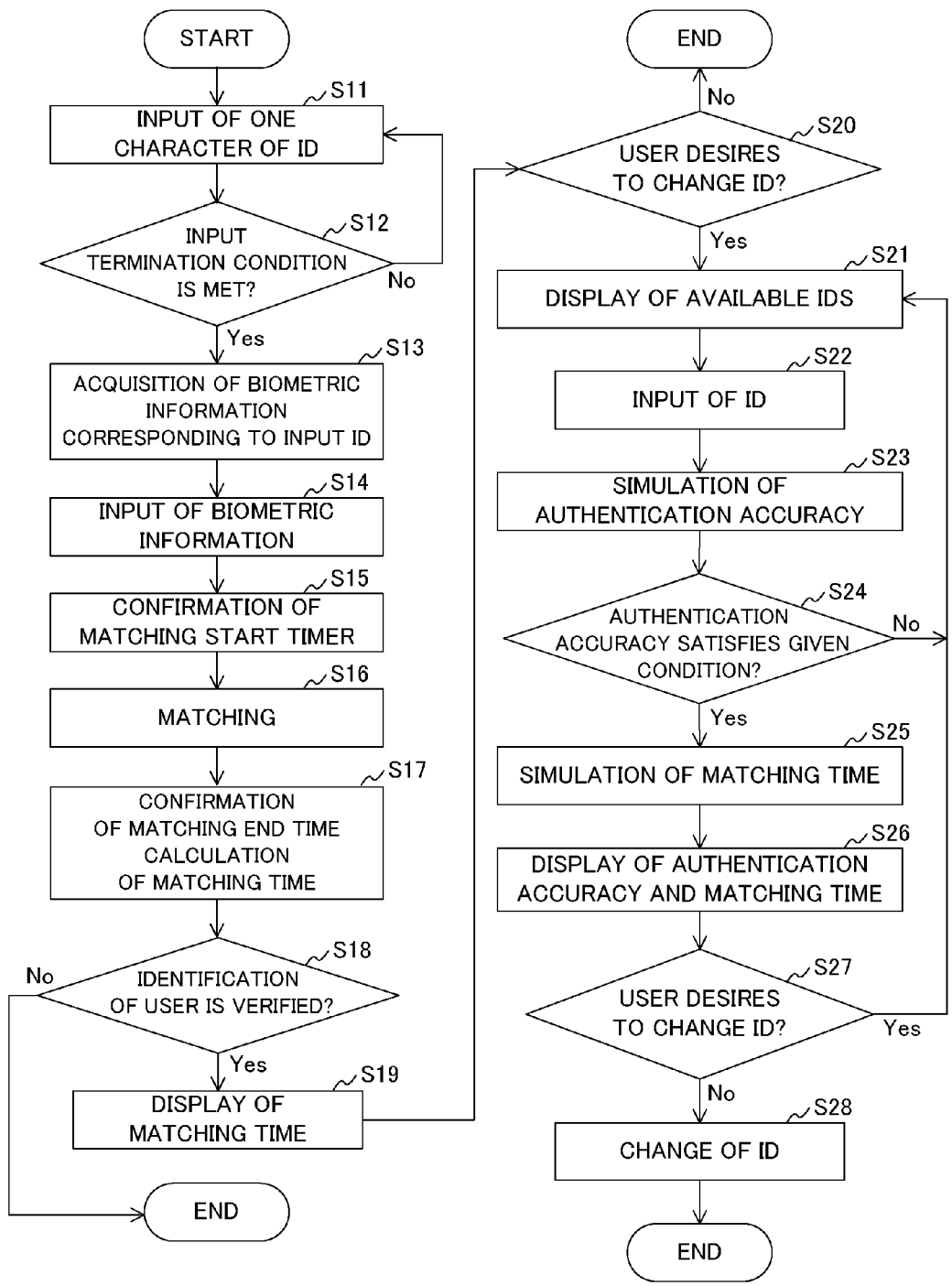
FIG. 7 is a flowchart showing authentication operation according to the embodiment.

Next, operation of the ID setting/changing section 11 at the user authentication (matching) time will be described with reference to a flowchart of FIG. 7. It is determined whether an input termination condition is met every time the user inputs one character (steps S11 and S12).

This eliminates the need for the user to input all characters or all digits of an ID at the matching time. This is because that, if the ID can be identified before the user inputs all characters or all digits of an ID, it is possible to allow the user to input the biometric information at the moment when the ID has been identified and then to execute "one-to-many identification" or "one-to-one verification" (if there is no overlap with other users). Similarly, this is because that even if the ID cannot be uniquely identified before the user inputs all characters or all digits of the ID, if the size of a set to be searched for becomes too small to impair the matching time or authentication accuracy, it is possible to allow the user to input the biometric information at the moment when the size of a set to be searched for becomes too small to impair the matching time or authentication accuracy and then to execute "one-to-many identification".

That is, in the present embodiment, when the user inputs the ID with a plurality of input operation steps at the authentication time, if the user ID can uniquely be identified before completion of the plurality of input operation steps, the user authentication processing can be started at an input operation step at which the user ID has been identified.

Further, the following function may be provided in which, when the user inputs the ID with a plurality of input operation steps, even if the user ID cannot uniquely be identified, if the number of pieces of registered registration information corresponding to the ID whose first some digits coincide with input digits is less than a predetermined number, the user authentication processing can be started at an input operation step at which the number of pieces of the registration information is less than a predetermined number.

In the case where such a function is provided, it is preferable that a numeric value corresponding to time simulated in consideration of a possibility that "one-to-many identification" is started along the way, or the possibility itself is presented to the user.

When the input termination condition is satisfied (Yes in step S12), the ID setting/changing section 11 acquires biometric information corresponding to the input ID (step S13), and receives biometric information from the biometric information input section (step S14). The ID setting/changing section 11 then confirms matching start time (step S15), carries out matching (step S16), and confirms matching end time and calculates matching time (step S17). Based on the calculation result, identification of the user is verified (step S18). When the identification of the user is not verified (No in step S18), this flow is ended at that moment. When the identification of the user is verified (Yes in step S18), the matching time is displayed (step S19).

FIG. 8 shows a message displayed in step S19. This message notifies the user of the matching time and asks the user if he wants to change the current ID to an ID that can reduce the matching time.

When the user desires to change the ID (Yes in step S20), the ID selection screen as shown in FIG. 3 is displayed (step S21) to allow the user to input an ID (step S22). Then, simulation of the authentication accuracy for the selected ID is performed (step S23), and it is determined whether the simulated authentication accuracy satisfies a predetermined condition (step S24).

When the authentication accuracy does not satisfy a predetermined condition (No in step S24), the flow returns to step S21 where the ID selection screen is displayed once again. When the authentication accuracy satisfies a predetermined condition (Yes in step S24), simulation of the matching time is then performed (step S25), and simulated authentication accuracy and matching time are displayed (step S26).

At the same time, a message asking the user if he wants to change the ID is displayed once again. When the user desires to change the ID (Yes in step S27), the flow returns to step S21. When the user does not desire to change the ID (No in step S27), this flow is ended.

In the above operation procedure, the ID set by the user is preferably constituted by a plurality of alphanumeric characters, symbols, or Kanji (Chinese character). The number of characters or digits may previously be determined, or the number of digits need not previously be determined.

After the simulated matching time is displayed on the display unit 12, if the user desires to change the ID, or when the user is requested to change the ID since the simulated authentication accuracy falls below a predetermined value, the number of characters or digits of the ID may vary before and after change.

In the presentation of the simulated authentication accuracy in step S26, it is preferable not to display an accurate analog numeric value in terms of security but to display a quantized digital value, value obtained by symbolizing a digital value, or analog numeric value with a fluctuation which is obtained by giving noise to an analog numeric value.

Further, as shown in FIG. 3, only IDs that have not been used by any other person, i.e., IDs for which matching time is short and authentication accuracy is not degraded may be displayed at the ID change time. Further, IDs that are used by a plurality of users, i.e., IDs for which matching time is long and authentication accuracy is degraded may be removed from the ID selection screen so as to prevent such IDs from being selected.

As described above, in the present embodiment, an opportunity for the user to change the ID is prepared not only at the user registration time but at the matching time. This is because that there may a case where, when a first user registers a given ID and, after that, a second user registers the same ID as the first user, the matching time for the first user becomes longer than originally expected. Thus, it is preferable to give an opportunity for the user to change the ID by displaying the matching time at the matching time.

As described above, at the matching time, it is not always necessary for the user to input all characters or all digits of the ID.

In the simulation of the matching time or authentication accuracy, a set of overlapping users to be searched for can be set as a set of registration information that perfectly matching the IDs. Further, in the case where simulation in which a set of registration information does not perfectly match the IDs, a set of registration information is regarded as a set of registration information that partially matches the first some characters or digits (e.g., two characters of "AB" of an ID "ABC" of the ID.

The simulation of the matching time is performed according to the biometric information authentication to be used. When the number of pieces of information to be searched for and corresponding matching time are stored in the form of a table, the matching time can be obtained by referring to the table. Further, when a function in which the number of pieces of information to be searched for is specified as an argument, the matching time can be obtained based on the function. Further, the matching time can be actually measured using the biometric information of the user.

The simulation of the authentication accuracy is performed according to the biometric information authentication to be used. When the number of pieces of information to be searched for and corresponding authentication accuracy are stored in the form of a table, the authentication accuracy can be obtained by referring to the table. Further, when a function in which the number of pieces of information to be searched for is specified as an argument, the authentication accuracy can be obtained based on the function. However, unlike the case of the simulation of the matching time, since the authentication accuracy of the biometric information authentication is generally calculated in a statistical manner, it cannot be actually measured.

When the authentication method of the present embodiment is applied to a room entering/leaving system, a user is allowed to specify a predetermined area on a graphic in place of inputting a room number for locking/unlocking. For example, the user is allowed to sequentially specify block number, floor number, area number, or room number. This is equivalent to sequential input of characters or digits of the ID from the beginning.

As described above in detail, according to the embodiment of the present invention, by using an ID to add a limitation to the search range of "one-to-many identification", the size of a set to be searched for in "one-to-many identification" becomes smaller, resulting in a reduction of search time. Further, false accept rate becomes reduced to thereby suppress degradation in the authentication accuracy.

Further, the matching time is simulated and its result is fed back to the user at the ID setting time. With this configuration, the user can confirm the convenience concerning the matching time. Further, in the case where the user does not satisfy the simulated matching time, he can change the ID, thereby enhancing satisfaction level of the user concerning the convenience. Further, the authentication accuracy is also simulated at the ID setting time and, when the authentication accuracy falls below a predetermined value, the user is allowed to change the ID. Thus, even if a plurality of users are concentrated on a certain ID, it is possible to prevent a degradation in the authentication accuracy. Further, since the user can freely set an ID, he can set an easy-to-remember ID, reducing a possibility that he forgets his ID.

As described above, an authentication apparatus according to the embodiment of the present invention includes a unit that inputs a user ID, a unit that inputs biometric information, and a registration information storage section that stores registration information of the user. The apparatus has a processing section that executes, in an authentication method that authenticates an individual based on an ID and biometric information, a function of allowing the user to freely set the ID at registration time, a function of simulating the authentication accuracy for the ID set by the user using registered registration information of other users, a function of allowing the user to change the current ID to another ID if the simulated authentication accuracy does not satisfy a predetermined condition, a function of generating registration information of the user based on the ID and biometric information acquired from the user, a function of storing the generated registration information in the registration information storage section, a function of selecting registration information corresponding to the ID specified by the user from the registration information storage section at the matching time, and a function of verifying identification of an individual by matching the selected registration information and biometric information of the user.

Further, an authentication system according to the embodiment of the present invention includes a unit that inputs a user ID, a unit that inputs biometric information, and a registration information storage section that stores registration information of the user. The system has a processing section that executes, in an authentication method that authenticates an individual based on an ID and biometric information, a function of allowing the user to freely set the ID at registration time, a function of simulating the authentication accuracy for the ID set by the user using registered registration information of other users, a function of allowing the user to change the current ID to another ID if the simulated authentication accuracy does not satisfy a predetermined condition, a function of generating registration information of the user based on the ID and biometric information acquired from the user, a function of storing the generated registration information in the registration information storage section, a function of selecting registration information corresponding to the ID specified by the user from the registration information storage section at the matching time, and a function of verifying identification of an individual by matching the selected registration information and biometric information of the user.

Further, by providing a program that allows a computer to execute the operations shown in the flowchart or steps shown in relation to the above embodiment, it is possible to provide a digital document management program of the present invention. By storing the above program in a computer-readable storage medium, it is possible to allow the computer to execute the program. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

INDUSTRIAL APPLICABILITY

According to the present invention, improvement in convenience and ensuring of authentication accuracy can easily be achieved in "one-to-many identification".

The invention claimed is:

1. An authentication apparatus that uses an ID and biometric information that have been registered and an ID and biometric information that are input after the registration to authenticate a user corresponding to the ID and biometric information that are input after the registration, comprising:
an authentication accuracy simulation section that simulates authentication accuracy for authentication; and
a registration information setting section that sets the ID and biometric information that are input, wherein
the authentication accuracy simulation section uses the ID and biometric information that are input as registration information by the user at the time of registration and the ID and biometric information that have been registered so as to simulate authentication accuracy where the user who input the ID and biometric information as the registration information is authenticated, and
the registration information setting section requests the user to change the ID input as the registration information when the authentication accuracy simulated by the authentication accuracy simulation section does not satisfy a predetermined condition.

2. The authentication apparatus according to claim 1, further comprising a matching time simulation section that simulates matching time for authentication, wherein
the matching time simulation section uses the ID and biometric information that have been input as registration information by the user and registered registration information to simulate matching time required to authenticate the user, and
the registration information setting section presents the matching time simulated by the matching time simulation section to the user and receives an instruction to change the ID from the user.

3. The authentication apparatus according to claim 1, further comprising a timer section that measures matching time required in the case where the ID and biometric information that have been input by the user at the time of authentication and registered registration information are used to authenticate the user, wherein
the registration information setting section presents matching time measured by the timer section to the user and receives an instruction to change the ID from the user.

4. The authentication apparatus according to claim 3, wherein
in the case where the registration information setting section received the instruction to change the ID, the authentication accuracy simulation section uses a newly input ID, registered biometric information and registered registration information to simulate authentication accuracy with which the user is authenticated, and
the registration information setting section rejects registration of the newly input ID when the authentication accuracy simulated by the authentication accuracy simulation section does not satisfy the predetermined condition.

5. The authentication apparatus according to claim 4, wherein
the registration information setting section requests the user to change the ID input as the registration information when the authentication accuracy simulated by the authentication accuracy simulation section does not satisfy the predetermined condition.

6. The authentication apparatus according to claim 3, further comprising a matching time simulation section that simulates matching time for authentication, wherein
the matching time simulation section uses the newly input ID, registered biometric information, and registered registration information to simulate matching time required to authenticate the user, and
the registration information setting section presents the matching time simulated by the matching time simulation section to the user and receives the instruction to change the ID from the user.

7. The authentication apparatus according to claim 1, wherein
the ID is constituted by a plurality of characters or numbers, or a combination thereof, and
the number of digits of the ID is set to the same value among all users or set to an arbitrary value not more than a predetermined upper limit.

8. The authentication apparatus according to claim 1, wherein
the registration information setting section applies at least one of quantization and noise addition to authentication accuracy simulated by the authentication accuracy simulation section and presents the resultant authentication accuracy to the user using a numeric value or symbol.

9. The authentication apparatus according to claim 1, wherein
available IDs for which simulated authentication accuracy satisfies a predetermined condition are displayed at one or both of the ID registration time and ID change time.

10. The authentication apparatus according to claim 1, wherein
when the user inputs an ID with a plurality of input operation steps at the authentication time, if the user ID can uniquely be identified before completion of the plurality of input operation steps, the user authentication processing can be started at an input operation step at which the user ID has been uniquely identified.

11. The authentication apparatus according to claim 1, wherein
when the user inputs an ID with a plurality of input operation steps at the authentication time, even if the user ID cannot uniquely be identified, if the number of pieces of registered registration information corresponding to the ID whose first some digits coincide with input digits is less than a predetermined number, the user authentication processing can be started at an input operation step at which the number of pieces of the registration information is less than a predetermined number.

12. The authentication apparatus according to claim 1, wherein
the authentication accuracy simulation section performs the authentication accuracy simulation based on the number of pieces of registration information to be searched for.

13. The authentication apparatus according to claim 2, wherein
the matching time simulation section performs the matching time simulation based on the number of pieces of registration information to be searched for or actually measures the matching time using biometric information corresponding to a target user.

14. An authentication program stored on a non-transitory computer readable medium for allowing a computer to execute an authentication method that uses an ID and biometric information that have been registered and an ID and biometric information that are input after the registration to authenticate a user corresponding to the ID and biometric information that are input after the registration, the program allowing the computer to execute:
an authentication accuracy simulation step that simulates authentication accuracy for authentication; and
a registration information setting step that sets the ID and biometric information that are input, wherein
the authentication accuracy simulation step uses the ID and biometric information that are input as registration information by the user at the time of registration and the ID and biometric information that have already been registered to simulate authentication accuracy where a user who input the ID and biometric information as the registration is authenticated, and
the registration information setting step requests the user to change the ID input as the registration information when the authentication accuracy simulated in the authentication accuracy simulation step does not satisfy a predetermined condition.

15. The authentication program stored on a non-transitory computer readable medium according to claim 14, further comprising a matching time simulation step that simulates matching time for authentication, wherein
the matching time simulation step uses the ID and biometric information that have been input as registration information by the user at the time of registration and the registered registration information to simulate matching time required to authenticate the user, and
the registration information setting step presents the matching time simulated by the matching time simulation section to the user and receives an instruction to change the ID from the user.

16. The authentication program stored on a non-transitory computer readable medium according to claim 14, further comprising a time counting step that measures matching time required in the case where the ID and biometric information that have been input by the user at the time of authentication and the registered registration information are used to authenticate the user, wherein
the registration information setting step presents matching time measured by the time counting step to the user and receives an instruction to change the ID from the user.

17. The authentication program stored on a non-transitory computer readable medium according to claim 16, wherein
in the case where the registration information setting step received the instruction to change the ID, the authentication accuracy simulation step uses a newly input ID, registered biometric information and registered registration information to simulate authentication accuracy with which the user is authenticated, and
the registration information setting step rejects registration of the newly input ID when the authentication accuracy simulated in the authentication accuracy simulation step does not satisfy a predetermined condition.

18. An authentication method that uses an ID and biometric information that have been registered and an ID and biometric information that are input after the registration to authenticate a user corresponding to the ID and biometric information that are input after the registration, comprising:
an authentication accuracy simulation step that simulates authentication accuracy for authentication; and
a registration information setting step that sets the ID and biometric information that are input, wherein
the authentication accuracy simulation step uses the ID and biometric information that are input as registration information by the user at the time of registration and the ID and biometric information that have already been registered to simulate authentication accuracy where a user who input the ID and biometric information as the registration is authenticated, and
the registration information setting step requests the user to change the ID input as the registration information when the authentication accuracy simulated in the authentication accuracy simulation step does not satisfy a predetermined condition.

* * * * *